United States Patent
Lim et al.

(10) Patent No.: US 9,099,760 B2
(45) Date of Patent: Aug. 4, 2015

(54) BATTERY PACK ASSEMBLY INCLUDING APPARATUS FOR DETECTING WATER ACCUMULATION AND METHOD FOR DETECTING WATER ACCUMULATION

(71) Applicants: Hyundai Motor Company, Seoul (KR); Kia Motors Corporation, Seoul (KR)

(72) Inventors: Hae Kyu Lim, Gyeonggi-do (KR); Yooncheol Jeon, Gyeonggi-do (KR); Jeong Hun Seo, Gyeonggi-do (KR); Yongjin Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 341 days.

(21) Appl. No.: 13/714,164

(22) Filed: Dec. 13, 2012

(65) Prior Publication Data
US 2014/0041449 A1    Feb. 13, 2014

(30) Foreign Application Priority Data
Aug. 8, 2012  (KR) .......................... 10-2012-0086918

(51) Int. Cl.
*G01F 23/70*    (2006.01)
*H01M 10/48*   (2006.01)
*G01F 23/30*    (2006.01)
(Continued)

(52) U.S. Cl.
CPC .............. *H01M 10/48* (2013.01); *G01F 23/30* (2013.01); *G01F 23/703* (2013.01); *H01H 35/18* (2013.01); *H01H 1/20* (2013.01)

(58) Field of Classification Search
CPC ..... G01F 23/64; G01F 23/76; G01F 23/0038; G01F 23/30; G01F 23/303; G01F 23/44; G01F 23/58; G01F 23/66; G08B 21/182; H01H 35/18; H01H 36/02
USPC ......................... 73/290 R, 305, 306, 307, 309
See application file for complete search history.

(56) References Cited

U.S. PATENT DOCUMENTS

| | | | | |
|---|---|---|---|---|
| 1,768,446 A | * | 6/1930 | Gron | 200/84 R |
| 4,080,985 A | * | 3/1978 | Eagle | 137/429 |
| 4,757,305 A | * | 7/1988 | Peso | 340/624 |

(Continued)

FOREIGN PATENT DOCUMENTS

| | | | | |
|---|---|---|---|---|
| CN | 201402170 Y | * | 2/2010 | G01F 23/04 |
| JP | 03146827 A | * | 6/1991 | G01F 23/62 |

(Continued)

*Primary Examiner* — David A Rogers
(74) *Attorney, Agent, or Firm* — Mintz Levin Cohn Ferris Glovsky and Popeo, P.C.; Peter F. Corless

(57) ABSTRACT

Disclosed is a battery pack assembly including an apparatus for detecting water accumulation inside an installation region in which a battery pack is installed. The battery pack assembly includes a watertight case installed on a bottom surface of the water accumulation detecting apparatus and assembled with the battery pack therein. The water accumulation detecting apparatus includes a body including a water inlet opening through which water accumulated in the installation region flows in. A floating member floated by buoyancy of the water flowing in the body. A switch unit is configured to generate a current when the floating member increases up to or beyond a predetermined height. An elastic member is configured to connect the floating member and the bottom surface of the body so that the floating member is positioned at a predetermined position when buoyancy of the water does not affect to the floating member.

6 Claims, 11 Drawing Sheets

(51) Int. Cl.
*H01H 35/18* (2006.01)
*H01H 1/20* (2006.01)

(56) References Cited

U.S. PATENT DOCUMENTS

| | | | | |
|---|---|---|---|---|
| 4,771,272 A | * | 9/1988 | Barnes | 340/624 |
| 4,879,545 A | * | 11/1989 | Aguilar | 340/624 |
| 4,920,797 A | * | 5/1990 | Swartz et al. | 73/309 |
| 5,026,954 A | * | 6/1991 | Cebulski | 200/84 C |
| 5,151,685 A | * | 9/1992 | Spicer et al. | 340/605 |
| 5,224,379 A | * | 7/1993 | Koebernik et al. | 73/308 |
| 5,999,101 A | * | 12/1999 | Gallagher | 340/618 |
| 6,480,113 B1 | * | 11/2002 | Esposito | 340/624 |
| 6,730,865 B1 | * | 5/2004 | Hernandez-Zelaya | 200/84 R |
| 6,786,091 B1 | * | 9/2004 | Aleali | 73/309 |
| 7,068,175 B1 | * | 6/2006 | Pennington | 340/623 |
| 7,315,250 B1 | * | 1/2008 | Hernandez-Zelaya | 340/624 |
| 7,417,552 B1 | * | 8/2008 | Vaskovic | 340/616 |
| 7,484,409 B2 | * | 2/2009 | Dykstra et al. | 73/319 |
| 8,196,466 B2 | * | 6/2012 | Beneker et al. | 73/304 R |
| 8,468,875 B1 | * | 6/2013 | Gutierrez | 73/40.5 A |
| 2003/0010118 A1 | * | 1/2003 | Heldberg | 73/309 |
| 2011/0090088 A1 | * | 4/2011 | Kenney et al. | 340/623 |
| 2014/0049396 A1 | * | 2/2014 | Walbert | 340/624 |

FOREIGN PATENT DOCUMENTS

| | | | |
|---|---|---|---|
| JP | 09107628 A | | 4/1997 |
| JP | 10111165 A | * | 4/1998 |
| JP | 2011173447 A | | 9/2011 |
| JP | 2011198713 A | | 10/2011 |

* cited by examiner

PRIOR ART

PRIOR ART

BATTERY PACK ASSEMBLY INCLUDING APPARATUS FOR DETECTING WATER ACCUMULATION AND METHOD FOR DETECTING WATER ACCUMULATION

CROSS-REFERENCE TO RELATED APPLICATION

This application claims priority to and the benefit of Korean Patent Application No. 10-2012-0086918 filed in the Korean Intellectual Property Office on Aug. 8, 2012, the entire contents of which are incorporated herein by reference.

BACKGROUND (a) Field of the Invention

The present invention relates to a battery pack assembly including an apparatus for detecting water accumulation inside an installation region (for example, a tire well) in which a battery pack is installed, and a method of detecting water accumulation.

(b) Description of the Related Art

Recently, in order to replace or supplement fossil fuel, hybrid electric vehicles and electric vehicles have become widely developed and used. A battery system is in these types of vehicles is typically installed. One of the primary components of the battery system is a battery pack which typically includes a plurality of modules.

FIG. 1 illustrates an example of a battery pack mounted to a tire well of a hybrid electric/electric vehicle. As illustrated in FIG. 1, a battery pack 20 may be installed in a tire well 10 by a bracket member 22. Furthermore, reference numeral 1 in FIG. 1 denotes a floor panel. This battery pack 20 is generally expensive because various components such as a battery and a high voltage component are packaged together.

The battery pack 20 is often installed in the tire well 10 inside a watertight case 24 in order to prevent malfunction of the battery due to condensation and/or water inlet inside the tire well 10 and in order prevent short circuiting of the battery. The watertight case 24 serves to prevent a battery cell within the battery pack 20 from coming into contact with water accumulated inside the tire well to protect the battery cell accordingly.

FIG. 2 illustrates an example of the watertight case 24. The battery pack 20 is generally installed in the watertight case 24. In particular, a form in which the battery pack 20 is installed in and assembled with the watertight case 24 is called a battery pack assembly. However, when the battery pack 20 is assembled with the watertight case 24 and installed in the tire well 10 as illustrated in FIG. 2, malfunction of the battery pack due to water accumulation inside the tire well 10 may only be prevented to a certain degree and safety of the battery pack 20 may only be secured to a certain degree. It is, however, conventionally impossible to completely prevent malfunction and secure safety realistically. Therefore, when water accumulates inside the tire well 10 at a dangerous level or higher, water may enter the watertight case 24, thereby causing malfunction of the battery pack.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a battery pack assembly including an apparatus for detecting water accumulation to prevent malfunction of a battery pack due to water accumulation inside an installation region of the battery pack assembly in advance by detecting water accumulation when water is accumulated inside the installation region in which the battery pack assembly is installed, and a method of detecting water accumulation.

An exemplary embodiment of the present invention provides a battery pack assembly including a water accumulation detecting apparatus inside an installation region in which a battery pack is installed. The battery pack assembly may include: a watertight case installed on a bottom surface of the water accumulation detecting apparatus and assembled with the battery pack therein. The water accumulation detecting apparatus may include a body including a water inlet opening through which water accumulated in the installation region flows therein; a floating member floated by buoyancy of the water flowing into the body; a switch unit configured to turn on and conduct a current (i.e., turned on) when the floating member increases to or beyond a predetermined height; and an elastic member configured to connect the floating member and the bottom surface of the body so that the floating member is positioned at a predetermined position when buoyancy of the water does not affect the floating member.

In the exemplary embodiment of the present invention, the switch unit may include: a conductor installed on the floating member; and a terminal unit installed in the body at the predetermined height to electrically form a closed circuit when in contact with the conductor. The switch unit may also include an on/off switch installed in the body at the predetermined height that is configured to be turned on when in contact with the floating member.

In the exemplary embodiment of the present invention, the elastic member may be embodied as a spring having elastic force less than the buoyancy of the water flowing in the body. At least two or more springs may be installed in the exemplary embodiment of the present invention, and the battery pack assembly may further include an alarm unit configured to generate an alarm upon receiving a closed circuit signal or an on-signal from the switch unit.

Another exemplary embodiment of the present invention provides a method of detecting water accumulation inside an installation region in which a battery pack assembly is installed, the method including: detecting, by a detecting apparatus an increased height of a floating member floated by buoyancy of water flowing into a watertight case of the battery pack assembly; and determining, by detecting apparatus, whether water accumulation inside the installation region has reached a dangerous water level based on whether the increased height is greater than or equal to a predetermined height.

In the exemplary embodiment of the present invention, whether the increased height of the floating member is greater than or equal to the predetermined height may be determined by an on-signal from a switch turned on/off via the floating member. Whether the increased height of the floating member is greater than or equal to the predetermined height may be determined more specifically based on whether a terminal contacting a conductor assembled with an upper surface of the floating member forms a closed circuit. Additionally, an alarm may be generated when the increased height of the floating member is the predetermined height.

As described above, according to the exemplary embodiment of the present invention, it is possible to prevent malfunction of a battery pack and/or a battery pack assembly due to water accumulation inside an installation region in advance by detecting water accumulation when water is accumulated inside the installation region (for example, a tire well) in which the battery pack assembly is installed at a dangerous level or higher, thereby improving reliability and durability of the battery pack assembly, an electric vehicle, and a hybrid electric vehicle.

BRIEF DESCRIPTION OF THE DRAWINGS

The above and other features of the present invention will now be described in detail with reference to an exemplary embodiment thereof illustrated the accompanying drawings which are given hereinbelow by way of illustration only, and thus are not limitative of the present invention, and wherein.

DETAILED DESCRIPTION OF THE EMBODIMENTS

Figure 1:
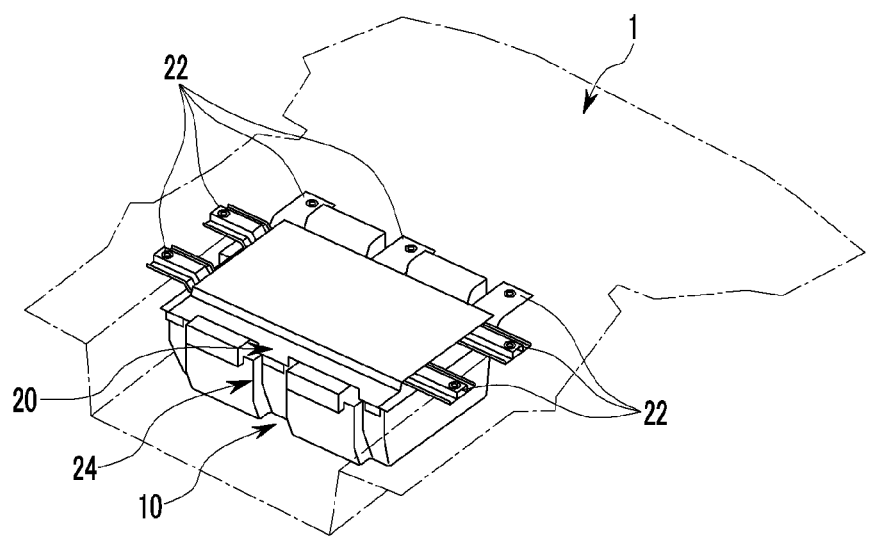
FIG. 1 is a perspective view conceptually illustrating a tire well in which a battery pack assembly may be installed and the battery pack assembly.
Figure 2:
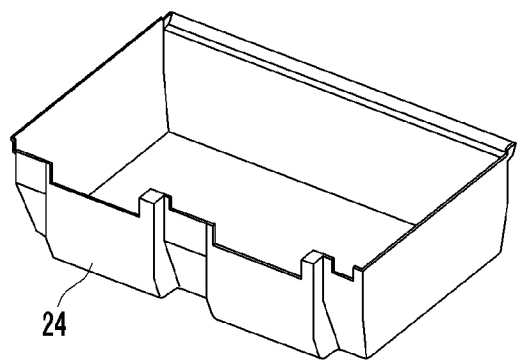
FIG. 2 is a perspective view of a watertight case for protecting a battery pack from water according to the related art.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, exemplary embodiments of the present invention will be described in detail with reference to the accompanying drawings.

In the following description, when a constituent member used in an exemplary embodiment of the present invention is the same as a constituent member of the related art, the same reference number may be used for simplicity and clearance of reference numbers.

Further, in the description of the exemplary embodiment of the present invention, it is described that an installation region in which a battery pack assembly is installed is a tire well. However, the tire well is simply an example for exemplarily describing a case in which a battery pack assembly is mounted in a space in which a spare time is mounted, so that it should be understood that the scope of the present invention is not limited thereto.

Even in a case where a spare tire is not mounted in a vehicle or a battery pack assembly is installed in another space, not the tire well, if a space in which a battery pack assembly is installed includes a recess so that there is a possibility of water accumulation, the technical spirit of the present invention may be applied thereto.

Referring to FIGS. 3 to 6, a water accumulation detecting apparatus 100 included in a battery pack assembly according to an exemplary embodiment of the present invention may detect water accumulation inside an installation region, for example, a tire well 10, in which the battery pack assembly (e.g., a battery pack and a watertight case) is installed.

In the exemplary embodiment of the present specification, the battery pack assembly may include the battery pack and the watertight case. To this end, the water accumulation detecting apparatus 100 may include a body 110 provided with a water inlet opening 112 in which water accumulated in the tire well 10 flows therein.

Figure 3:
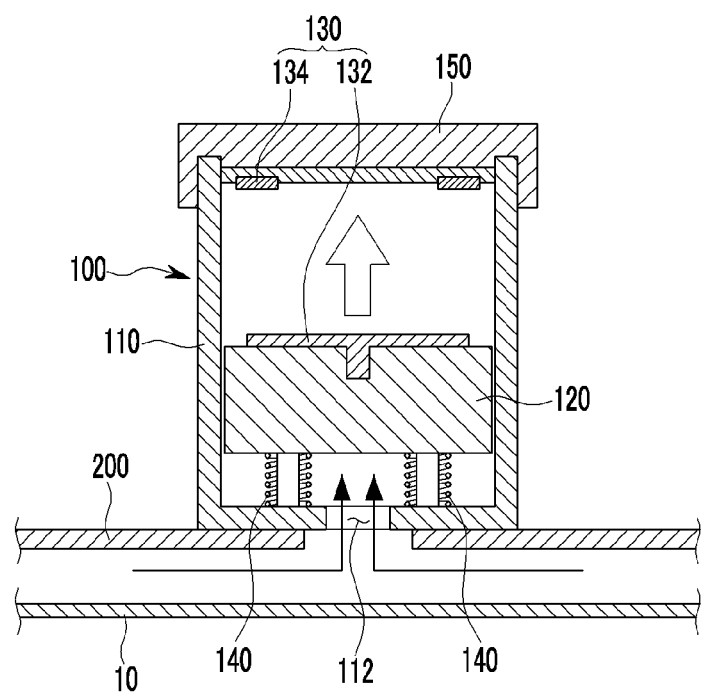
FIG. 3 is a cross-sectional diagram of an apparatus for detecting water accumulation included in a battery pack assembly according to an exemplary embodiment of the present invention.
Figure 4:
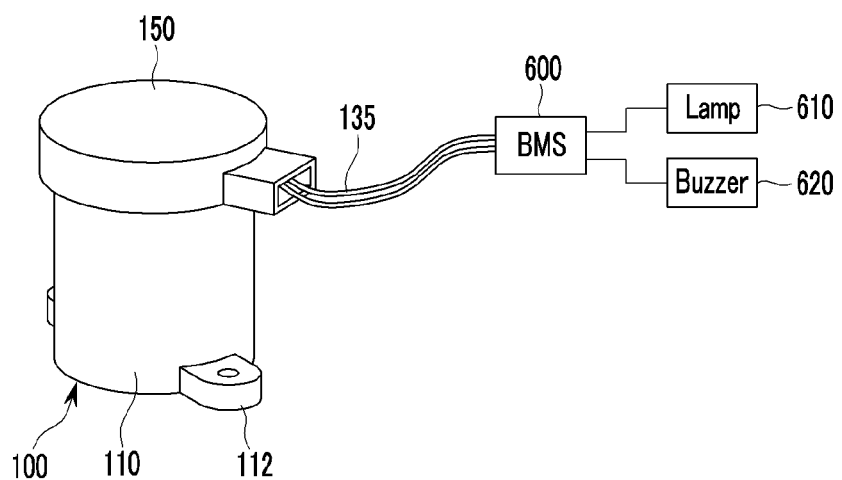
FIG. 4 is an exterior perspective view of an apparatus for detecting water accumulation included in a battery pack assembly according to an exemplary embodiment of the present invention.
Figure 5:
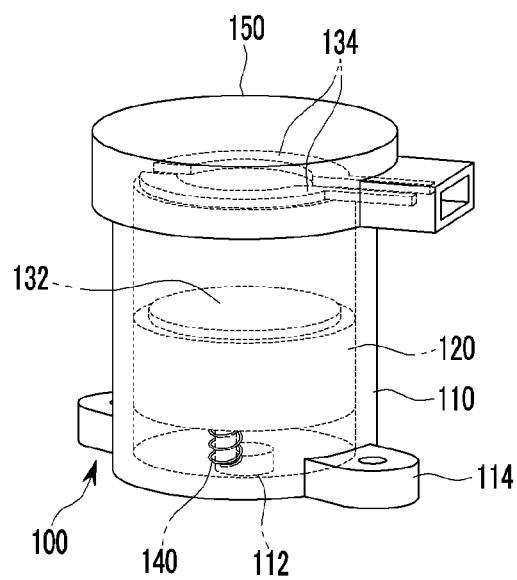
FIGS. 5 and 6 are interior three-dimensional perspective views of an apparatus for detecting water accumulation included in a battery pack assembly according to an exemplary embodiment of the present invention, respectively.

In FIG. 3, a direction of water flowing in through the water inlet opening 112 is indicated by an arrow. The water inlet opening 112 may have various shapes (for example, a circle, an ellipse, etc.) which allows water to smoothly flow into the opening.

The body 110 may include a bracket 112 to be assembled with a watertight case 200 to be described later. The body 110 may in some exemplary embodiments of the present invention be formed in a cylindrical shape, but the scope of the present invention is not limited thereto. For example, the body 110 may also be formed in various shapes, such as an ellipsoidal cylinder, a quadrangular cylinder, etc., in consideration of a design aspect, cost and economical approach.

The body 110 may be made of a plastic material, but again the scope of the present invention is not limited thereto. For example, in the alternative the body 110 may be made of a metal material for improving durability.

A floating member 120 floating via buoyancy of water flowing in through the water inlet opening 112 of the body 110 is movably installed inside the body 110. In FIG. 3, a direction of movement of the floating member 120 is indicated by a large arrow. The floating member 120 may be made of a material having low density, for example, cork, compressed Styrofoam, and/or an equivalent material thereof. That is, any material capable of being floated by buoyancy of water may be used to embody the floating member 120.

A conductor 132 may be installed on the floating member 120. Further, a terminal 134 configured to electrically create a closed circuit when coming in contact with the conductor 132 may be installed in the body 110 at a predetermined height. The terminal 134 may be embodied as any type of conductor through which electricity may flow, but may be made of for example, copper or a metal equivalent thereto.

The predetermined height is a height H (see FIG. 8) indicating that the water has accumulated in the tire well 10 to a dangerous level or higher. This predetermined height may be determined via experimental data and set thereto.

Figure 6:
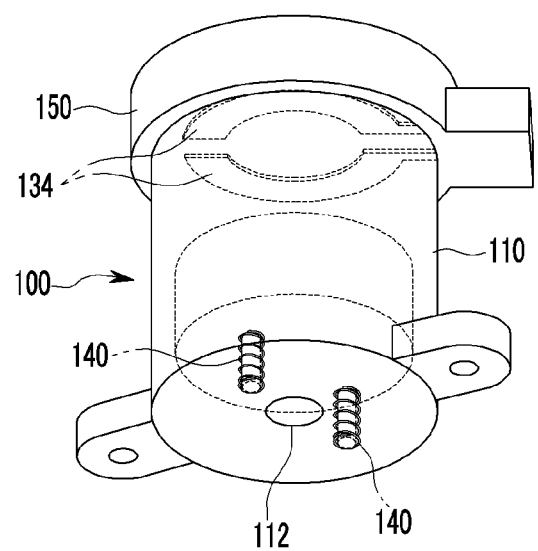

When a body cover 150 is assembled with the body 110 in the exemplary embodiment of the present invention, a lower surface of the body cover 150 corresponds to the predetermined height. Accordingly, the terminal 134 may be installed in the lower surface of the body cover 150 as illustrated in FIG. 6.

The conductor 132 may come into contact with the terminal 134 by ascension of the flowing member 120 so that the closed circuit is formed, thereby detecting water accumulation inside the tire well 10 is at a dangerous level. However, since the conductor 132 and the terminal 134 are easily exposed to water or moisture, there is a high possibility in that the conductor 132 and the terminal 134 become easily corroded.

Figure 11:
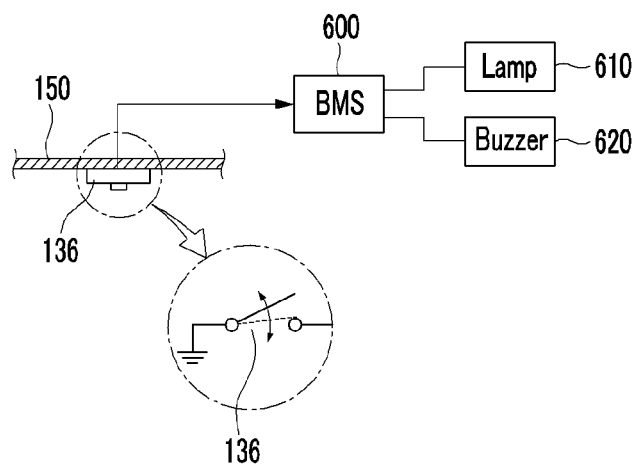
FIG. 11 is a configuration diagram of an on/off switch applied to an apparatus for detecting water accumulation included in a battery pack assembly according to an exemplary embodiment of the present invention.

Accordingly, as another exemplary embodiment of the present invention, an on/off switch 136 may be installed as illustrated in FIG. 11, instead of the conductor 132 and the terminal 134. Any well known on/off switch may be directly used, but the on/off switch 136 should be preferably a waterproof on/off switch.

An installation position of the on/off switch 136 is a position in which the on/off switch 136 turns "on" when the floating member 120 ascends to the predetermined height so that the upper surface of the floating member 120 is in contact with the on/off switch 136. Otherwise, the on/off switch 136 may be installed at a position corresponding to an installation position of the terminal 134.

Installation of the on/off switch 136 is well understood by those skilled in the art, so that a detailed description thereof will be omitted in the present specification for brevity.

In the exemplary embodiment of the present invention, elastic members 140 for connecting the floating member 120 and a bottom surface of the body 110 so that the floating member 120 is positioned at a predetermined position, for example, a center portion of the body 110, when the floating member 120 is not affected by buoyancy of water may be further included. The elastic member 140 should be floated by buoyancy of water when water flows into the body 110, so that the elastic member 140 having elastic force or elastic resistance force less than buoyancy of water should preferably be selected. If a member has elastic resistance force less than buoyancy of water as descried above, any member may be used as the elastic member 140, but the elastic member 140 may be, e.g., a coil spring or a plate spring.

Since the floating member 120 and the elastic member 140 have weight thereof, it may be understood to those skilled in the art that buoyancy of water affected to the floating member 120 needs to be greater than a total of elastic resistance force of the elastic member 140 and gravity affected by the floating member 120 and the elastic member 140.

Alternatively, when a member has elastic resistance force less than buoyancy of water, any member may be used as the elastic member 140, but the elastic member 140 may have elastic resistance force that allows the floating member 140 to be maintained at a current position even though a shock imposed on the body 110.

Further, the elastic member 140 may be symmetrically installed at two or more places. In order to reduce a possibility in that malfunction is generated due from shock or shaking of the floating member 140 when a shock or impact is applied to the body 110 when only one elastic member 140 is installed, the elastic member 140 is symmetrically installed at two or more places.

In the meantime, in the exemplary embodiment of the present invention, when the terminal 134 forms the closed circuit or the on/off switch 136 turns on according to the contact with the conductor 132, a closed circuit signal or an on-signal at this time may be input in a battery management system (BMS) control module 600 (i.e., a controller including a processor and a memory) according to a signal line 135. When the closed circuit signal or the on-signal is input in the BMS control module 600, the BMS control module 600 warns an operator that water has accumulated up to the dangerous level inside the tire well 10 through an alarm lamp 610 or an alarm buzzer 620.

A lamp or a buzzer which is already mounted in the vehicle may be directly used as the alarm lamp 610 or the alarm buzzer 620. Otherwise, a lamp and/or a buzzer dedicated to water accumulation alarm may be separately installed.

Figure 7:
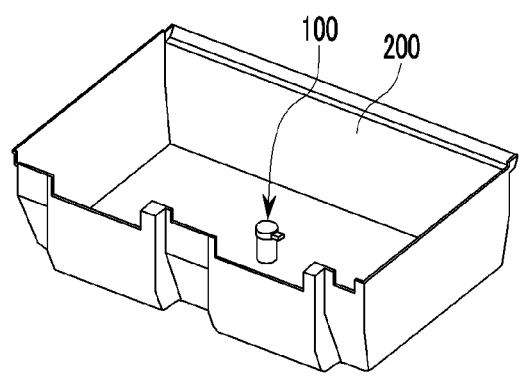
FIG. 7 is a perspective view of a watertight case in which an apparatus for detecting water accumulation according to an exemplary embodiment of the present invention is installed.
Figure 8:
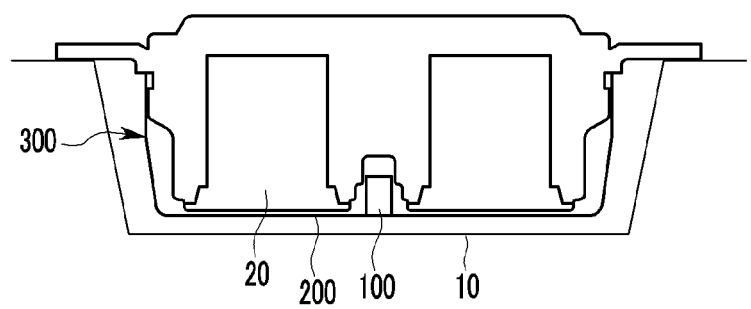
FIG. 8 is a front configuration diagram of a battery pack assembly according to an exemplary embodiment of the present invention.

The water accumulation detecting apparatus 100 may be used while being assembled with the watertight case 200 as illustrated in FIGS. 7 and 8. When the water accumulation detecting apparatus 100 is assembled with the watertight case 200, a body bracket 114 may be used. The battery pack 20 of the exemplary embodiment of the present invention may be generally installed inside the watertight case 20 assembled with the water accumulation detecting apparatus 100, so that the form in which the battery pack 20 is installed in the watertight case 200 is a battery pack assembly 300 including the water accumulation detecting apparatus as described above.

Figure 9:
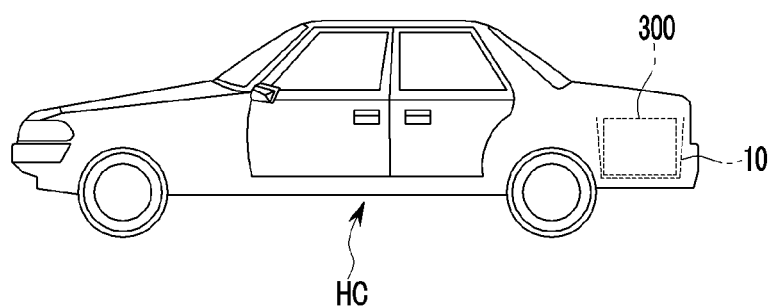
FIG. 9 is a conceptual diagram of a vehicle in which a battery pack assembly according to an exemplary embodiment of the present invention is mounted.
Figure 10:
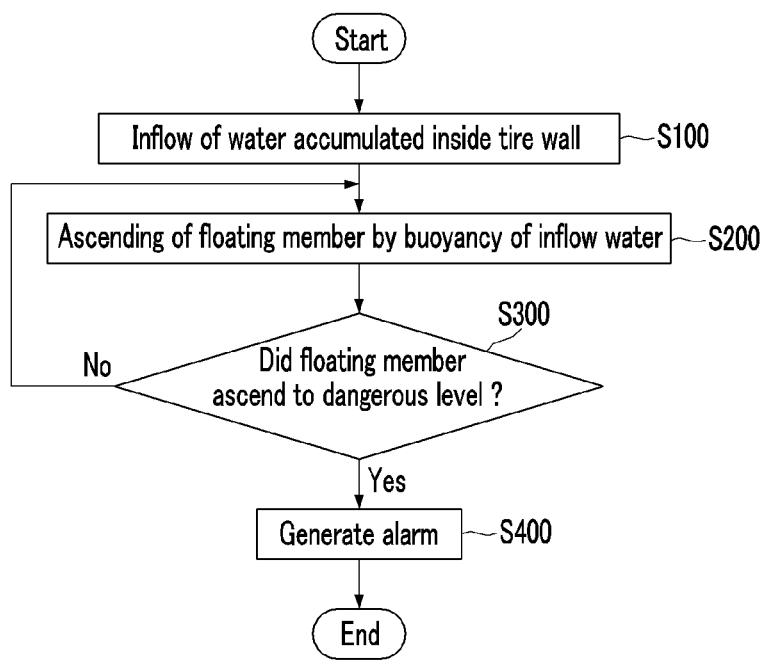
FIG. 10 is a flowchart of a method of detecting water accumulation according to an exemplary embodiment of the present invention.

The battery pack assembly 300 including the water accumulation detecting apparatus according to the exemplary embodiment of the present invention may be mounted inside the tire well 10 of a hybrid electric vehicle (HC) or an electric vehicle as illustrated in FIG. 9.

An action and operation of an exemplary embodiment of the present invention based on the water accumulation detecting apparatus according to the exemplary embodiment of the present invention including the aforementioned configuration will be described with reference to FIGS. 3 to 11.

For example, water accumulation may be generated inside the tire well 10 of the hybrid electric vehicle due to various reasons, for example, condensation and water inlet from the outside. When water is accumulated inside the tire well 10 so that the watertight case 200 of the battery pack assembly 300 including the water accumulation detecting apparatus 100 starts to be submerged, water flows into the body 110 through the water inlet opening 112 formed at the body 110 of the water accumulation detecting apparatus 100 (S100).

When the water flowing into the body 110 reaches the floating member 120, the floating member starts to ascend by buoyancy of the water (S200). Since elastic resistance force of the coil spring elastic member 140 is less than buoyancy of water as described above, the floating member 120 ascends by buoyancy of the water.

When the amount of water accumulation inside the tire well 10 reaches a dangerous level H as illustrated in FIG. 8, the amount of water flowing into the body 110 increases and thus the floating member 120 continuously ascends, so that the conductor 132 installed on the floating member 120 comes into contact with the terminal 134 installed in the lower portion of the body cover 150 (S300 and S400). When the conductor 132 is in contact with the terminal 134, the separated terminal 134 is connected to electrically form a closed circuit and thus a closed circuit signal is input in the BMS control module 600.

When the closed circuit signal is input in the BMS control module 600, the BMS control module 600 turns on the lamp 610 and/or operates the buzzer 620 so that a driver (or user) is notified that the water has accumulated inside the tire well 10 reaches the dangerous level.

Through the aforementioned water accumulation alarm, the driver (or user) may directly discharge water accumulated inside the tire well 10 directly or through A/S, thereby preventing malfunction of the battery pack assembly 300 including the water accumulation detecting apparatus in advance.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| <Description of symbols> | |
|---|---|
| 100: Water accumulation detecting apparatus | 110: Body |
| 112: Water inlet opening | 120: Floating member |
| 130: Switch member | 140: Elastic member |
| 150: Body cover | 200: Watertight case |
| 300: Water accumulation detecting battery pack | |

What is claimed is:

1. A battery pack assembly comprising a water accumulation detecting apparatus inside an installation region in which a battery pack is installed, the battery pack assembly comprising:
   a watertight case installed on a bottom surface of the water accumulation detecting apparatus and assembled with the battery pack therein,
   wherein the water accumulation detecting apparatus comprises:
      a body including a water inlet opening through which water accumulated in the installation region flows therein;
      a floating member floated by buoyancy of the water flowing in the body;
      a switch unit configured to create a electrical connection when the floating member rises to or beyond a predetermined height; and
      an elastic member configured to connect the floating member and a bottom surface of the body so that the floating member is positioned at a predetermined position when buoyancy of the water is not affecting the floating member.

2. The battery pack assembly of claim 1, wherein:
   the switch unit comprises:
      a conductor installed on the floating member; and
      a terminal unit installed in the body at the predetermined height to form a closed circuit when in contact with the conductor.

3. The battery pack assembly of claim 1, wherein:
   the switch unit comprises:
      an on/off switch installed in the body at the predetermined height to be turned on when in contact with the floating member.

4. The battery pack assembly of claim 1, further comprising:
   an alarm unit configured to generate an alarm by receiving a closed circuit signal or an on-signal of the switch unit.

5. The battery pack assembly of claim 1, wherein:
   the elastic member is a spring having elastic force less than the buoyancy of the water flowing into the body.

6. The battery pack assembly of claim 5, wherein:
   at least two or more springs are installed.

\* \* \* \* \*